F. C. BLANCHARD & E. B. CROCKER.
PIPE UNION.
APPLICATION FILED JULY 21, 1909.

959,702.

Patented May 31, 1910.

WITNESSES
Charles D. Woodbury
Josephine H. Ryan

INVENTORS,
Frederick C. Blanchard,
Ernest B. Crocker.
By Roberts, Roberts & Cushman
attorneys

UNITED STATES PATENT OFFICE.

FREDERICK C. BLANCHARD AND ERNEST B. CROCKER, OF BRIDGEPORT, CONNECTICUT, ASSIGNORS TO THE ASHCROFT MANUFACTURING COMPANY, OF BRIDGEPORT, CONNECTICUT, A CORPORATION OF CONNECTICUT.

PIPE-UNION.

959,702. Specification of Letters Patent. Patented May 31, 1910.

Application filed July 21, 1909. Serial No. 508,772.

*To all whom it may concern:*

Be it known that we, FREDERICK C. BLANCHARD and ERNEST B. CROCKER, citizens of the United States, and residents of Bridgeport, in the county of Fairfield and State of Connecticut, have invented new and useful Improvements in Pipe-Unions, of which the following is a specification.

Our invention relates to pipe unions of the type wherein the female member is provided with a groove or recess having a gasket or ring secured therein, and its object is to provide a pipe union of the class described wherein the gasket or ring is firmly and securely seated within the groove.

Figure 1:
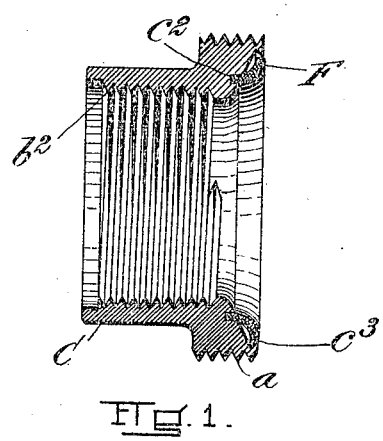
Figure 2:
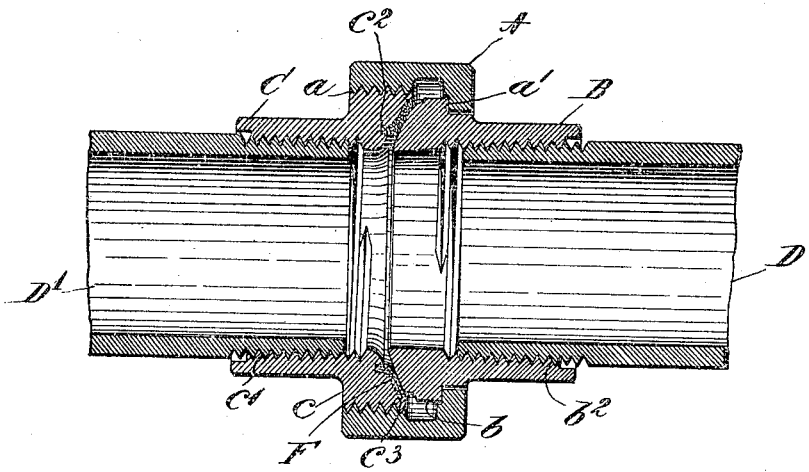

Referring to the drawings:—Figure 1 is a detail showing the gasket before it is secured upon its seat; and Fig. 2 is a cross section showing the gasket after it has been secured upon its seat.

A is the coupling nut, B the male member and C the female member. The coupling nut A is threaded in the usual manner at $a$ and is provided with a shoulder $a'$. The male member B has a flange $b$ adapted to engage and rest upon the shoulder $a'$ of the nut A and the face or upper surface of the flange $b$ is convex. Internal threads are provided at $b^2$ to receive the threaded end of the pipe D.

The female member C is provided with a flange $c$ externally threaded to engage the threaded portion $a$ of the nut A and internal threads are provided at $c'$ to engage the threaded end of the pipe D'. Upon the inner side of the flange $c$ there is formed a circumferential groove having a recess $c^2$ at its inner edge and an under cut recess $c^3$ at its outer edge forming an overhanging lip. This groove serves as a seat for the gasket F which is seated and secured thereon in the manner presently to be described.

The gasket F, in order to avoid the chance of porous or defective material often encountered in seats made of cast metal, is made of ductile metal preferably sheet copper. After it has been punched and formed to spin into its seat, it is placed within the groove or seat with its lower edge resting within the recess $c^2$, in the position shown in Fig. 1. A suitable spinning tool is then brought up against the gasket flattening it down, expanding the metal so as to fill the seat and locking the outer edge under the overhanging lip of the recess $c^3$ so that the gasket is secured dove-tail fashion in its seat. By this process of spinning the copper and locking its edges in the recesses the gasket is firmly secured upon its seat and cannot work loose in use or be easily detached by mischievous persons. If, however, the gasket is worn out in use or becomes defective, it can be scored through with a suitable tool, as a cold chisel, and pried out. A new gasket may then be seated within the groove in the manner already described, or in case it is necessary or desirable to replace the gasket without disconnecting the union from the piping, the new gasket may be secured in the following manner: The gasket formed as already described is placed within the groove in the position shown in Fig. 1. The convex face of the male member is then brought against the gasket and the pressure obtained by screwing the coupling nut home will suffice to press and squeeze the gasket into its seat, locking its edges in the recesses and holding it firmly upon its seat.

It will be understood that our invention shown as applied to screw pipe unions, is equally applicable to flange pipe unions.

What we claim and desire to secure by Letters Patent is:

In a pipe union, the combination with a coupling nut and a male member, of a female member provided with a groove or seat having a recess at its inner edge and a lip at its outer edge, and a gasket of ductile metal having its inner edge resting within said recess and its outer edge locked beneath said lip.

Signed by us at Bridgeport, Connecticut, this 16th day of July 1909.

FREDERICK C. BLANCHARD.
ERNEST B. CROCKER.

Witnesses:
 WM. R. STROUD,
 S. F. CONE.